April 2, 1935.  E. W. KRONBACH  1,996,207

DIPPING AND MEASURING DEVICE FOR LIQUIDS

Filed July 15, 1933

INVENTOR
Edwin W. Kronbach
BY
ATTORNEY

Patented Apr. 2, 1935

1,996,207

UNITED STATES PATENT OFFICE 1,996,207

DIPPING AND MEASURING DEVICE FOR LIQUIDS

Edwin W. Kronbach, Cleveland Heights, Ohio, assignor to Popsicle Service, Inc., Brooklyn, N. Y., an organization of Illinois Application July 15, 1933, Serial No. 680,590

3 Claims. (Cl. 73—62)

The present invention relates to the art of dipping and measuring liquid and/or semi-liquid materials, and it has particular relation to improvements in a device which may be used as a combination dipper and measuring container in transferring liquid and/or semi-liquid materials from one receptacle to another.

An object of the present invention is to provide a simple and inexpensive device which may be used as a dipper, and which is adapted to be suspended vertically on the edge of a supply tank of any thickness or shape.

Another object of the invention is the provision of a device of the character described which will permit any liquid in excess of a predetermined volume secured during the dipping operation to drain off or out of the container and into the supply tank, while being suspended from the edge thereof, thereby eliminating the necessity of inverting, tilting, etc. to dispose of any excess liquid collected therein.

Other and further objects and advantages of the device will be apparent from the following description, wherein a preferred form of embodiment of the invention is shown, reference being had to the accompanying drawing forming a part thereof, in which.

Figure 1:
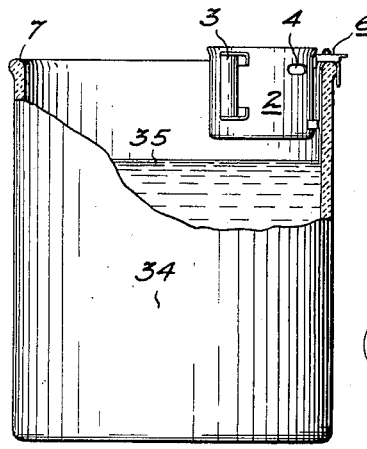
Figure 1 shows a device, made in accordance with the invention, suspended from an edge of a supply tank.
Figure 2:
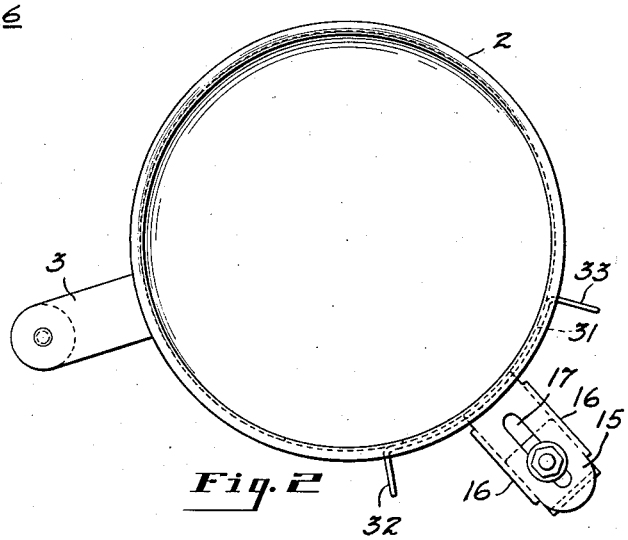
Figure 2 is a top plan view, on an enlarged scale, of the device shown in Figure 1.

In the manufacture of frozen novelties and the like, which are most expeditiously made in molds having a plurality of pendant cavities, it is advantageous to pour a correct amount of unfrozen material, which is liquid or semi-liquid at normal temperatures, into the mold to evenly fill each of the individual pendant cavities with a predetermined quantity of material. In the larger manufacturing plants the filling operation is usually accomplished by the employment of expensive and complicated filling machines, and in the smaller plants by means of a dipping ladle or pitcher. This latter method is quite unsatisfactory in that the skill of the operator must be relied upon to accurately measure the volume of liquid required. Sometimes several dipping operations are necessary under such practice, and then again considerable time is consumed in inverting and tilting the mold to remove excess material that has been poured into it.

In order to obviate these difficulties and the delays incident to measuring and transferring a given volume of liquid from one receptacle to another, I have provided a novel, simple and inexpensive device by which the dipping, measuring and transporting of liquid materials may be quickly and conveniently accomplished with a great degree of accuracy.

Referring now to the drawing, this device comprises an open-top container 2 having a handle 3 mounted on the side thereof. The container is provided with a circumferentially extending opening 4 in one side thereof, which provides an outlet for the excess liquid material collected in the container during the dipping operation. The opening 4 is positioned in the side of the container at a predetermined distance from the bottom thereof, which distance is calculated and dependent upon the volume of liquid desired to be collected and transferred during the dipping operation.

Mounted on the side of the container 2 and preferably spaced from the handle 3 and the opening 4, is an adjustable clamping member 6 adapted to engage the top edge of the supply tank.

The clamping member 6 consists of two L-shaped metal strips 11 and 12. The strip 11 has its shorter end 14 welded or soldered to the sidewall of the container 2 adjacent the upper edge thereof, and the longer end 15 projects outwardly and horizontally from the side of the container. The longer end 15 is provided with downwardly projecting flanges 16 along its sides and with a longitudinally extending slot 17 intermediate its ends. The strip 12 has an aperture 21 in its shorter end 22 which is adapted to receive a bolt.

Figure 5:
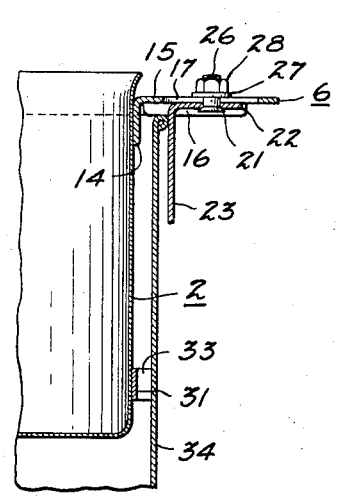
Figure 5 is a fragmentary cross-sectional view of the device shown in Figure 3, suspended from the edge of a supply tank having vertical sidewalls and a beaded upper edge.
Figure 3:
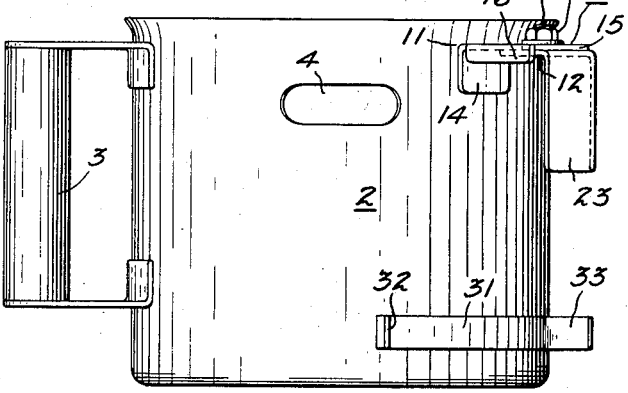
Figure 3 is a side elevational view of the device shown in Figure 2.
Figure 4:
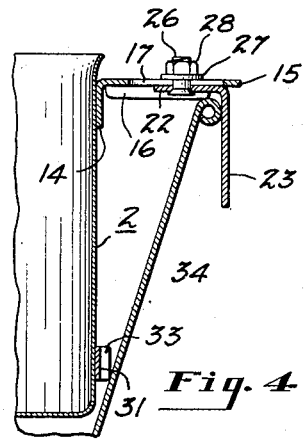
Figure 4 is a fragmentary sectional view of the device shown in Figure 3, suspended from the edge of a supply tank having inclined sidewalls.

In assembling the clamping member 6, the shorter end 22 of the strip 12 may be positioned below the projecting end 15 of the strip 11 and within the flanges 16 thereof. In this position the aperture 21 is aligned with the slot 17 of the strip 11, and the strips are adapted to be clamped together by means of a bolt 26, lock washer 27 and nut 28. When the strips 11 and 12 are secured together in this manner, the longer end 23 of the strip 12 is spaced from the sidewall of the container 2 and extends downwardly in a plane parallel thereto. The space between the container 2 and the end 23 of the strip 12 may be varied by sliding the strip 12 along the slot 17 of the strip 11. As shown in Figures 4 and 5 the strip 12 may be assembled in reverse position on the strip 11, which will give a greater range of adjustability of the clamping member 6.

Positioned centrally of and directly below the clamping member 6 and adjacent the lower end of the container 2 is a spacer bracket 31, arcuate in shape to conform to the curvature of the container. The spacer bracket is welded or soldered to the container and is provided with outward projecting ends 32 and 33, which engage the inside of the supply tank 34, thereby maintaining the container in vertical alignment and thus assuring a proper level for the liquid therein.

In operation of the device, the container 2 is manually grasped by the handle 3 and dipped into the liquid 35 in the supply tank 34. When filled the container 2 is withdrawn from the liquid 35 and is suspended on the inside of the tank 34, as best shown in Figure 1, by the clamping member 6, which is mounted over the edge of the tank. The excess liquid collected in the container 2 by the dipping operation will run out or drain off through the opening 4 and back into the tank 34 until the liquid level in the container is even with the bottom of the opening 4. The ends 32 and 33 of the spacer bracket 31 engage the inside of the tank and cause the container to be suspended vertically, thereby maintaining a horizontal level of the liquid in the container. The liquid remaining in the container is of a definite volume sufficient to fill a mold and may be poured into the mold without loss of time or danger of over or under filling the pendant cavities.

Although I have only described in detail one form which the invention may assume it will be apparent to those skilled in the art that the invention is not so limited, but that various modifications may be made therein without departing from the spirit thereof or from the scope of the appended claims.

What I claim is as follows:

1. In a dipping device for removing measured amounts of liquid from a supply tank and in combination, an open-top container, a handle secured to the wall of said container, a clamp mounted on the container wall for hooking over the top edge of a supply tank, said container having an opening in the side wall thereof for draining off liquid in excess of the desired measured amount to return said excess to the supply tank, and means for slidably adjusting said clamp to supply tank walls of different thicknesses and slopes and cooperating with the outer wall of the container to cause said container to be retained in vertical position when said clamp is hooked over a supply tank wall.

2. In a dipping device for removing measured amounts of liquid from a supply tank and in combination, an open-top container, a handle secured to the wall of said container, a spacer on the container for engaging the inner wall of a supply tank, a clamp mounted on the container wall for hooking over the top edge of the supply tank, said container having an opening in the side wall thereof for draining off liquid in excess of the desired measured amount to return said excess to the supply tank, and means for slidably adjusting said clamp to supply tank walls of different thicknesses and slopes to cause said container to be retained in vertical position when said clamp is hooked over a supply tank wall.

3. In a dipping device for removing measured amounts of liquid from a supply tank and in combination, an open-top container, a handle secured to the wall of said container, a spacer on the container for engaging the inner wall of a supply tank, a clamp mounted on the container wall for hooking over the top edge of the supply tank, said container having an opening in the side wall thereof for draining off liquid in excess of the desired measured amount to return said excess to the supply tank, means for adjusting said clamp to supply tank walls of different thicknesses and slopes to cause said dipping device to be retained in vertical position when said clamp is hooked over a supply tank wall, and means for locking said clamp against change of adjustment.

EDWIN W. KRONBACH.